T860,024

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1010

768,921

SENSITIZERS FOR FINE GRAIN PHOTOGRAPHIC SILVER HALIDE EMULSIONS, e.g., A LIPPMANN TYPE EMULSION

Norman W. Kalenda, % Kodak Park Works, Rochester, N.Y. 14650

Filed Oct. 18, 1968. Published Mar. 25, 1969

Class 96—107

No Drawing. 9 Pages Specification

Certain sulfonic acid and carboxylated derivatives of bis-(triazinylamino)stilbene, p-terphenyl, dibenzothiophene dioxide and chrysene such as bis(5-triazin-2-ylamino)-stilbene-2,2′-disulfonic acid (sodium salt); 4,4″-bis-(2,4-dimethoxy-5-sulfobenzamido)-p-terphenyl, triethanolamine salt; 4,4′-bis[2-phenoxy-4-(2-hydroxyethylamino)-1,3,5-triazin-6-ylamino]-stilbene-2,2′-disulfonic acid, sodium salt; chrysenesodium sulfonate; 4,4″-bis(4-sulfophenoxyacetamido)-p-terphenyl, triethanolamine salt; 3,7-bis(2-naphthoylamido)-2,8-disulfodibenzothiophene-5,5-dioxide, sodium salt; 3,7-bis(1,3-dicarboxypropylurylene)dibenzothiophene dioxide, sodium salt; 4,4′-bis[2,4-di(2-hydroxyethylamino)-1,3,5-triazin-6-ylamino]-stilbene-2,2′-disulfonic acid, sodium salt are effective sensitizers for increasing sensitivity of fine grain photographic silver halide emulsions, e.g., a Lippmann type emulsion. These compounds, for example, are useful in chemically sensitizing unfinished, fine grain, photographic silver halide emulsions.